United States Patent
Mittal et al.

(10) Patent No.: US 10,112,532 B2
(45) Date of Patent: Oct. 30, 2018

(54) TELL-TALE LIGHTING DESIGN OPTIMIZATION FOR INSTRUMENT PANEL CLUSTERS

(71) Applicant: N.S. International, LTD, Troy, MI (US)

(72) Inventors: Anshuman Mittal, Troy, MI (US); Sibing Xu, Rochester Hills, MI (US); Saketh Samaymantri, Troy, MI (US); Arul Krishna, Farmington Hills, MI (US)

(73) Assignee: N.S. International, LTD., Troy, MI (US)

( * ) Notice: Subject to any disclaimer, the term of this patent is extended or adjusted under 35 U.S.C. 154(b) by 15 days.

(21) Appl. No.: 15/430,993

(22) Filed: Feb. 13, 2017

(65) Prior Publication Data

US 2018/0229650 A1    Aug. 16, 2018

(51) Int. Cl.
| | |
|---|---|
| *B60K 35/00* | (2006.01) |
| *B60K 37/02* | (2006.01) |
| *B60Q 3/14* | (2017.01) |
| *G01D 11/28* | (2006.01) |
| *F21V 11/08* | (2006.01) |
| *F21Y 115/10* | (2016.01) |
| *F21Y 113/13* | (2016.01) |

(52) U.S. Cl.
CPC .............. *B60Q 3/14* (2017.02); *B60K 35/00* (2013.01); *B60K 37/02* (2013.01); *F21V 11/08* (2013.01); *G01D 11/28* (2013.01); *B60K 2350/203* (2013.01); *F21Y 2113/13* (2016.08); *F21Y 2115/10* (2016.08)

(58) Field of Classification Search
CPC ... B60Q 3/10; B60Q 3/12; B60Q 3/14; B60K 35/00; B60K 37/02; B60K 2350/203; B60K 2350/206; B60K 2350/2086; G01D 11/28; G01D 13/28; F21Y 2113/13; F21Y 2115/10

See application file for complete search history.

(56) References Cited

U.S. PATENT DOCUMENTS

| | | | | |
|---|---|---|---|---|
| 4,233,927 A | * | 11/1980 | Oikawa | G01D 11/28 116/287 |
| 5,578,985 A | * | 11/1996 | Cremers | B60K 37/02 340/459 |
| 6,025,820 A | * | 2/2000 | Salmon | B60K 37/02 116/286 |
| 6,168,280 B1 | * | 1/2001 | Ozawa | G01D 11/28 362/23.17 |
| 6,179,429 B1 | * | 1/2001 | Sheldon | B60Q 3/64 362/23.15 |
| 6,461,006 B1 | * | 10/2002 | Matumoto | G01D 11/28 362/23.16 |
| 6,520,654 B2 | * | 2/2003 | Angell | B60K 37/02 116/DIG. 36 |
| 6,854,350 B2 | * | 2/2005 | Ayres | B60K 37/02 362/23.18 |
| 7,066,630 B1 | * | 6/2006 | Venkatram | G01D 7/04 362/23.16 |

(Continued)

*Primary Examiner* — Hargobind S Sawhney
(74) *Attorney, Agent, or Firm* — Gunther J. Evanina; Butzel Long (57) ABSTRACT

The disclosure relates to an improved instrument panel design with reduced buzz, squeak and rattle as well as reduced light leakage to instrument panel telltales.

12 Claims, 6 Drawing Sheets

(56) References Cited

U.S. PATENT DOCUMENTS

| | | | | |
|---|---|---|---|---|
| 7,562,637 B2* | 7/2009 | Mori | ............... | B60K 37/02 |
| | | | | 116/300 |
| 8,089,351 B2* | 1/2012 | Eich | ............... | B60K 37/02 |
| | | | | 340/425.5 |
| 8,967,839 B2* | 3/2015 | Zietz | ............... | G01D 13/04 |
| | | | | 362/23.19 |
| 2007/0157869 A1* | 7/2007 | Takato | ............ | B60K 37/02 |
| | | | | 116/286 |
| 2012/0120345 A1* | 5/2012 | Takato | ............ | B60K 37/02 |
| | | | | 349/62 |

* cited by examiner

TELL-TALE LIGHTING DESIGN OPTIMIZATION FOR INSTRUMENT PANEL CLUSTERS

TECHNICAL FIELD

Instrument clusters for vehicles are increasingly important in overall vehicle design and customer satisfaction. An instrument cluster provides relevant vehicle information to an operator, and includes instruments, warning lights and other "tell tales". An instrument cluster is a highly complex structure comprising a visor, a light emitting housing, an appliqué and a printed circuit board, light emitting assemblies. The appliqué may be configured to include various "tell tales" or warning lights that are preferably not illuminated except when needed. Generally, light emitting assemblies for automotive and other applications are light emitting diodes (LEDs), but may be incandescent bulbs, or fiber optics. However, due to the complex construction of instrument panels, light leakage from the lighting assemblies occurs and the tell tales may be partially lit during vehicle operation. Such light leakage detracts from the aesthetics of the instrument cluster and may cause the operator to disregard a tell tale even when illuminated. This light leakage may occur because of warpage of the instrument cluster during curing and subsequent part mismatch between components during construction of the instrument cluster. The warpage and mismatch that inherently occur also requires the use of fasteners, such as, for example screws, to secure the various components of an instrument cluster into a module. The fasteners represent a cost in the manufacture of the instrument cluster that has been a problem in the industry. In addition, an instrument cluster may experience buzz, squeak and rattle during its useful life that detract from operator satisfaction with a vehicle. It is continuing problem to create instrument clusters that minimize light leakage, minimizes the number of fasteners necessary to create the instrument cluster, and control buzz, squeak and rattle.

DETAILED DESCRIPTION

Figure 1:
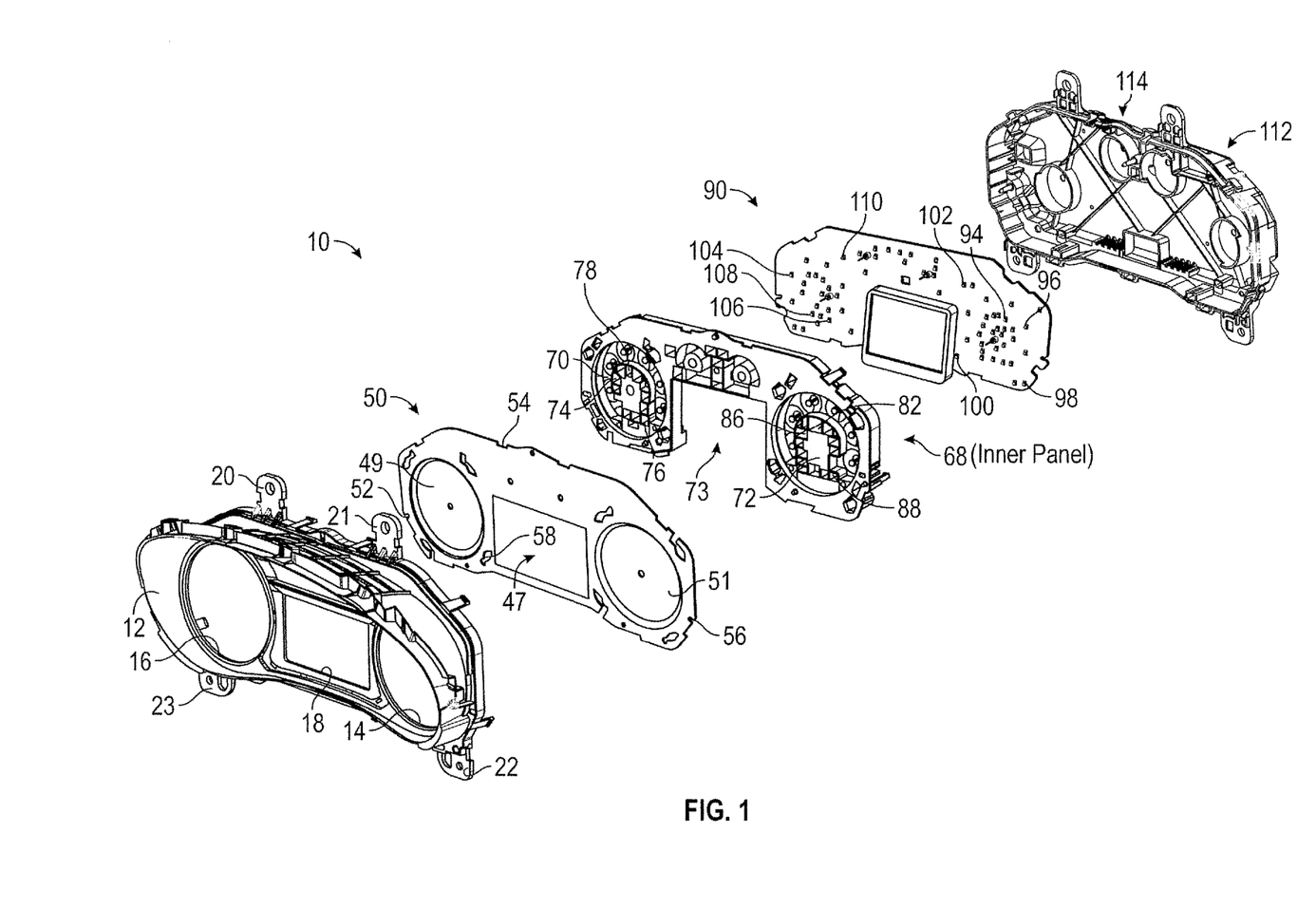
FIG. 1 an exploded view of an instrument cluster showing its construction.

Turning now to the drawings wherein like numbers refer to like structures, and particularly to FIG. 1, there is shown an exploded schematic view of an instrument panel 10, such as an automobile instrument panel, according to one aspect of the present disclosure. The instrument cluster has an outer panel, such as visor 12, equipped with instrument apertures 14, 16 and 18, to accommodate various instrument gauges (such as speedometer, tachometer, etc.) and other controls, systems or radio or infotainment systems and controls. The instrument visor is further equipped with aperture attachment flanges 20, 21, 22 and 23, to permit the assembled instrument panel to be secured into place in the vehicle interior. As is well known, the instrument cluster may also include a transparent substrate overlying at least the visor body aperture for viewing said gauge. Suitable transparent substrates include plates, plastic, film or any other medium.

An appliqué 50 has instrument detents 49 and 51, together with aperture 47 to accommodate instrument gauges and the radio or infotainment system of an exemplary vehicle instrument cluster. The appliqué is equipped with locator indents 52, 54, 56 to position the appliqué relative to the light-housing. The appliqué further has apertures 60, 62, 64, and 66 at detent 49 to permit light from LEDs on printed circuit 90 to pass there through and illuminate tell tales or warning lights on the appliqué.

An inner case, such as light housing 68 (an inner panel) has instrument recesses 70 and 72 to accommodate instruments such as speedometer, tachometers etc, as well as a cut out 73 to accommodate the radio/infotainment system. The light housing has apertures 74, 76, 78, and 80 at recess 70, and apertures 82, 84, 86, and 88 at recess 72 to permit the admission of light from LEDs on the printed circuit.

Printed circuit board 90 includes circuits and is electrically connected to a vehicle electrical system for powering all the instrument gauges of the vehicle. The printed circuit board includes light emitting diodes (LEDs) 96, 98, 100, 102, 104, 106 108 and 110 as indicated for emitting light to the appliqué to light the tell tales as will be hereafter be described. The LEDs are positioned on the circuit board in any configuration as to be complementarily accessible to the various gauges and tell tales of the instrument panel. As described, it may be understood that the printed circuit board may have a mass of approximately 500 grams. An outer case 112 is provided to make the instrument panel unit. The outer case and the inner case are secured together with a minimum number of fasteners 111, 113, 114, 115 (FIG. 6) in a manner to be hereinafter described.

Figure 2:
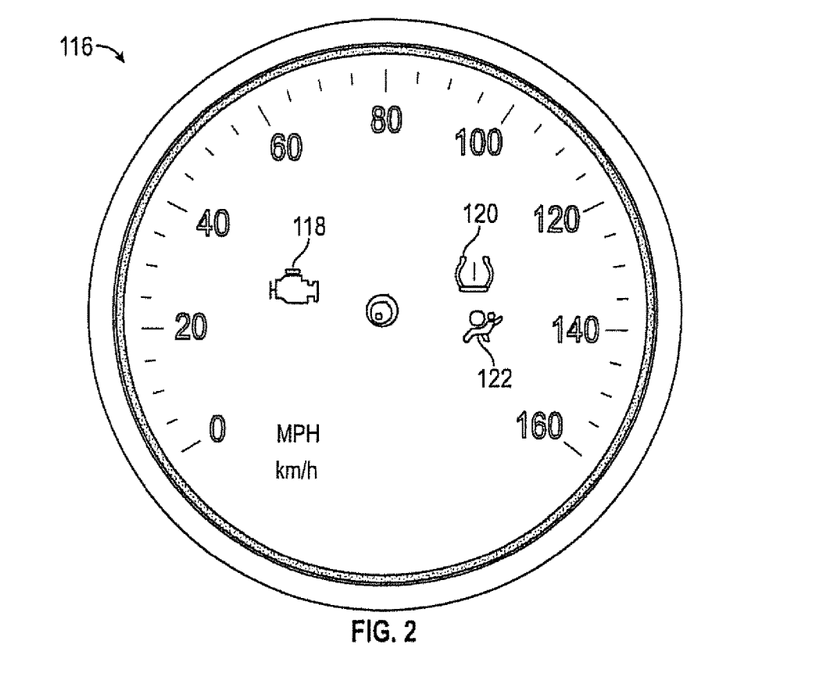
FIG. 2 is a front view of an appliqué showing various telltales.

FIG. 2 is a front view of an appliqué 116 with "tell tales" 118, 120, and 122. Each tell-tale corresponds to a different warning signal, such as, for example engine light 118, low tire pressure 120 and occupant safety system 122. Those skilled in the art will understand that any number of tell-tales can be included, and those described here are only exemplary and not limiting. The accepted appearance of the appliqué is that the tell-tales are not lit except when they are used to show an actual equipped or safety issue with the vehicle or its occupants.

It has been a continuing issue with instrument panels that even when the tell tales are not lit, leakage of light from the illuminating sources for the dials "leaks" from where it is needed to the telltales, thereby at least partially lighting them. This detracts from the aesthetic appearance of the instrument panel, and may decrease the usefulness of the telltale because the difference of being lit or not lit may not be noticeable by the operator because of image fatigue. The operator's mind may become used to the telltales when they are partially lit and not determine that when lit there is an actual issue with the vehicle or the safety of the occupants.

Figure 3:
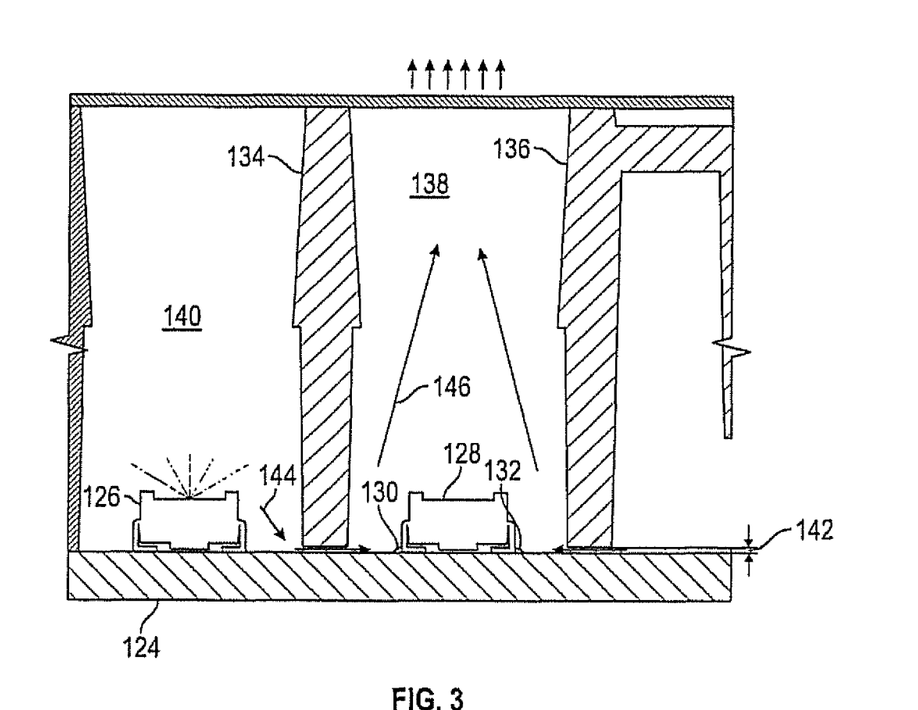
FIG. 3 is detailed view of a section of an instrument cluster with light leaks.

Turning now to FIG. 3, there is shown a detailed representation of an instrument panel that experiences light leakage. The printed circuit board 124 is equipped with several LEDs 126 and 128, which are soldered to the circuit board at solder joints 130, and 132. The light housing has projections 134 and 136 which create various light tunnels 138 and 140, which help direct light from the LED toward an appliqué.

Based on automotive regulations, the telltales are lit with different color LEDs which could vary from Amber, Green, Blue and White. The light leakage between telltales of different colors could also impact the color coordinates of the telltales in illuminated condition. By design, the light housing is designed to be always in contact with the printed circuit board to ensure no light rays escape between them. The flatness of the light housing's contact surface is also controlled by design with a flatness tolerance of ±0.05 mm. Because of molding and manufacturing constraints, it has been found that such flatness are almost always impossible to achieve and parts warpage could change the flatness level to ±0.5 mm. In existing designs, a sandwich strategy has been adopted where the PCB is sandwiched between the light housing and the outer case through snaps. Because of the heavy weight of the PCB relative to the entire cluster's weight (approx. 1000 grams), the snaps' strength is significantly reduced as the cluster goes through validation testing, especially vibration with thermal cycling test. The test is carried out in all three axes (x, y, z) with each axis being subjected to 36 hours of vibration with thermal cycle. The thermal cycle causes the plastics to warp and deform and along with 2 $G_{rms}$ of vibration load, the internal features added to retain the PCB in place are damaged (or worn-off) and slight relative movement of PCB occurs with respect to the cluster. The cluster is then tested for Buzz, Squeak and Rattle performance where the PCB's relative movement create rattle which is much higher than customer's specifications and is considered a failure. The PCB's movement and the warpage of the parts during thermal testing also contribute to light leakage and leads to customers' dissatisfaction.

Design Optimization-Phase One:

To counter light leakage, it is first important that PCB's attachment scheme is made robust to eliminate any impact caused by parts' warpage and validation testing. The use of fasteners or screws is adopted. With this strategy, the location and the quantity of screws become critical to ensure that the parts' warpage can be completely countered by screws and gaps between PCB and light housing can be minimized. The electrical components and traces (artwork) on the PCB also provide another set of constraints on the availability of the space where the fasteners can be placed. Through various simulation analysis, it was found that 5 screws design with the screws being placed close to the telltale areas would help in countering the parts warpage significantly. On major gages, the screws shall lie on a straight line through the gage center (see FIG. 6). Through various testing on actual parts, it was also confirmed that the buzz, squeak and rattle (BSR) issues were also eliminated with the addition of screws. Though even 3 screws would have helped in reducing BSR, however it was found that they were not enough to counter light leakage.

Design Optimization: Phase 2 On evaluation of actual parts, it was found that the use of 5 fasteners significantly reduced light leakage between telltales and met the customers' validation testing requirements. However, few telltales still showed feeble leakage which was perceptible to naked eyes. Such light leakage 144 may strike the solder joints 130, 132 and be reflected at 146 toward the applique and this light leakage is believed to be one of the causes of the partial lighting of the telltales that so affects the aesthetic appearance of the instrument cluster.

Figure 6:
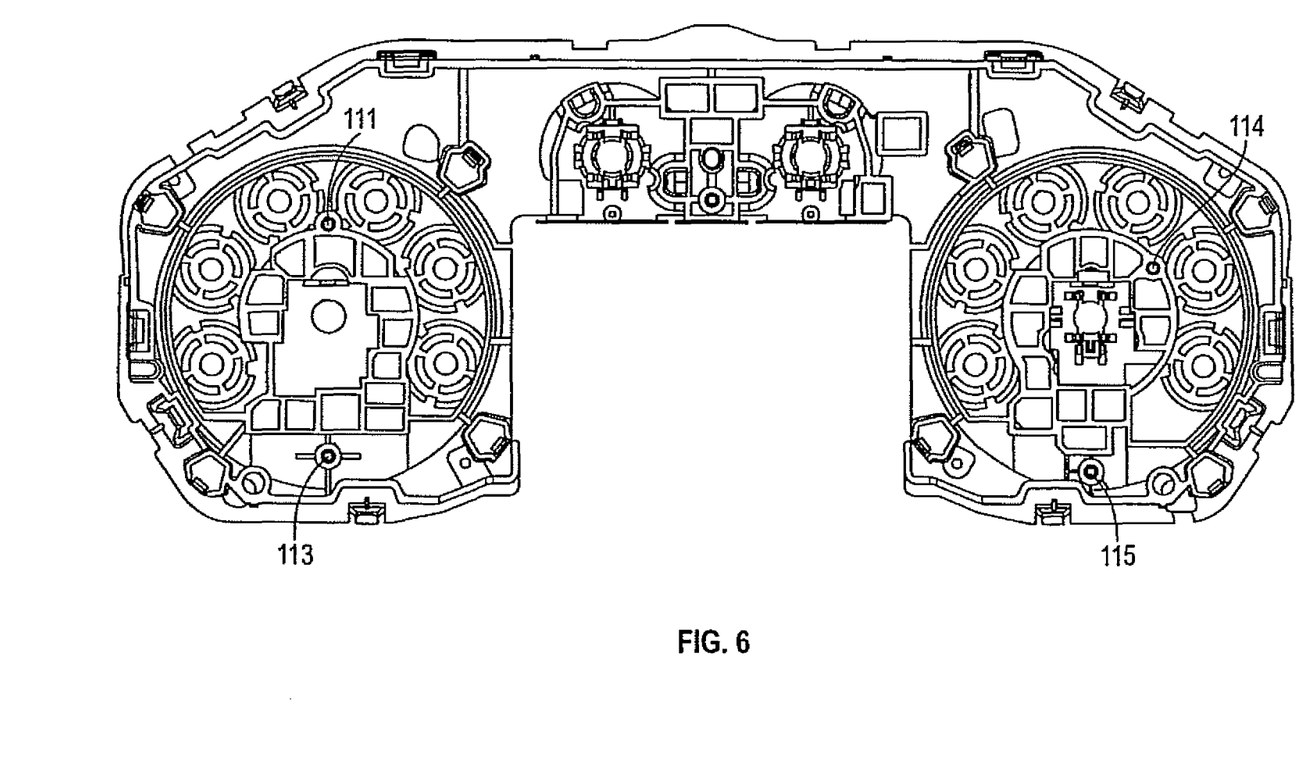
FIG. 6 is a back view of the light housing of FIG. 1 showing the location of the fasteners.

FIG. 6 is a back view of the light housing of FIG. 1 showing the location of fasteners. The location of fasteners in the construction of an instrument cluster has been a recurring issue because of the number of the fasteners necessary to secure the cluster together as well as the location of the fasteners. Because the warpage of the material from which the cluster is made differs depending upon the material used (for example Polyethylene propylene warps at different points than other material used, it is necessary to ensure that the light doesn't leak into the instrument dial and give a false tell, while at the same time limiting or reducing the buzz and squeak that is associated with using fasteners. The discussion relative to Design optimization in paragraphs 0019 and 0020 above are especially relevant as it is has been determined that the number of fasteners can be unexpectedly reduced by following the Design optimization set forth above. In practice is was found that 4 fasteners 111, 113, 114, and 115 may be used to optimize the number of fasteners used with the warpage of the panel to reduce light leakage to imperceptible levels.

Figure 4A:
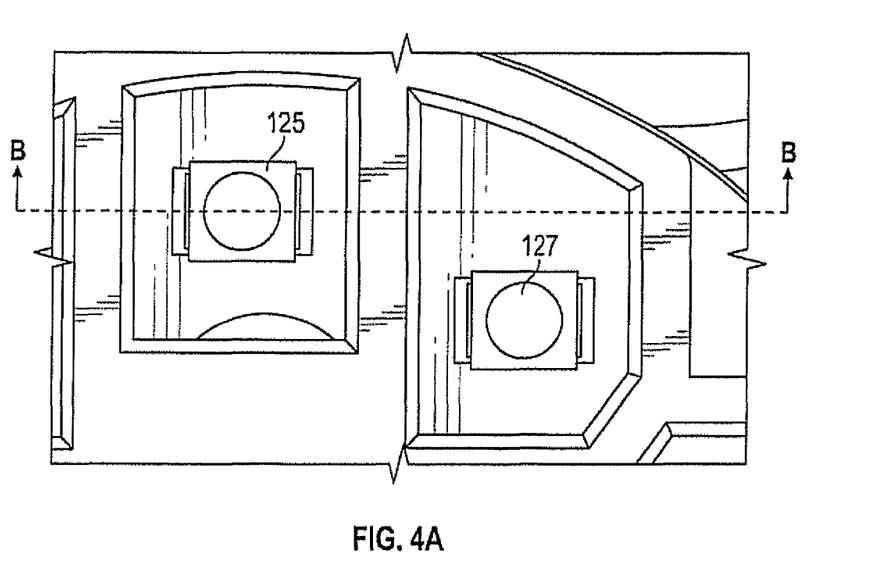
FIG. 4A is detailed view of an instrument cluster equipped with LEDs according to one embodiment.
Figure 4B:
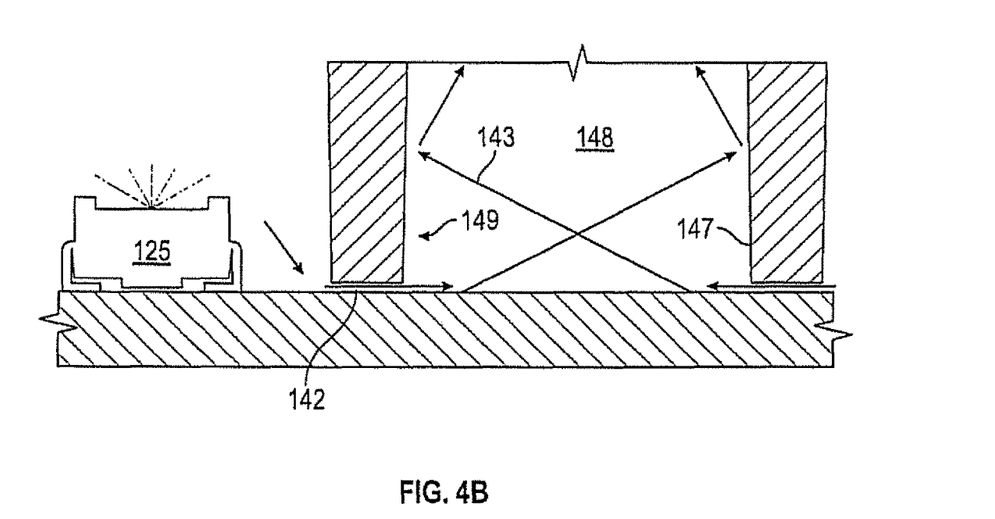
FIG. 4B is a detailed view of an instrument cluster taken along line B-B of FIG. 4A.

Turning now to FIG. 4A, there is shown a detail of an instrument panel with LED 125 and 127 mounted on a printed circuit board. FIG. 4B is taken along line B-B of FIG. 4A showing another phenomenon of light leakage into the tell-tale light chimney 148. Specifically, as the LED 125 leaks light 143 through space 142, the light travels into the tell-tale chimney and the light is reflected along the walls 147 of the telltale light chimney. The reflection happens in part because telltale chimney are made of a polypropylene material that is a bright white color and presents a polished surface 149. The white material is required to minimize light losses and improve the lighting efficiencies, however it plays a negative role with respect to light leakage as it amplifies it.

As described above, there are at least two main reason that the light leakage cause a partial lighting of the telltales on an appliqué. To counter this phenomenon directly, light blocking features may be added to the telltale light chimneys to permit only that light to pass through the light chimney to light a telltale, but will not permit light that passes from another light chimney through space 142 to unintentionally light the telltale associated with that light chimney.

Figure 5A:
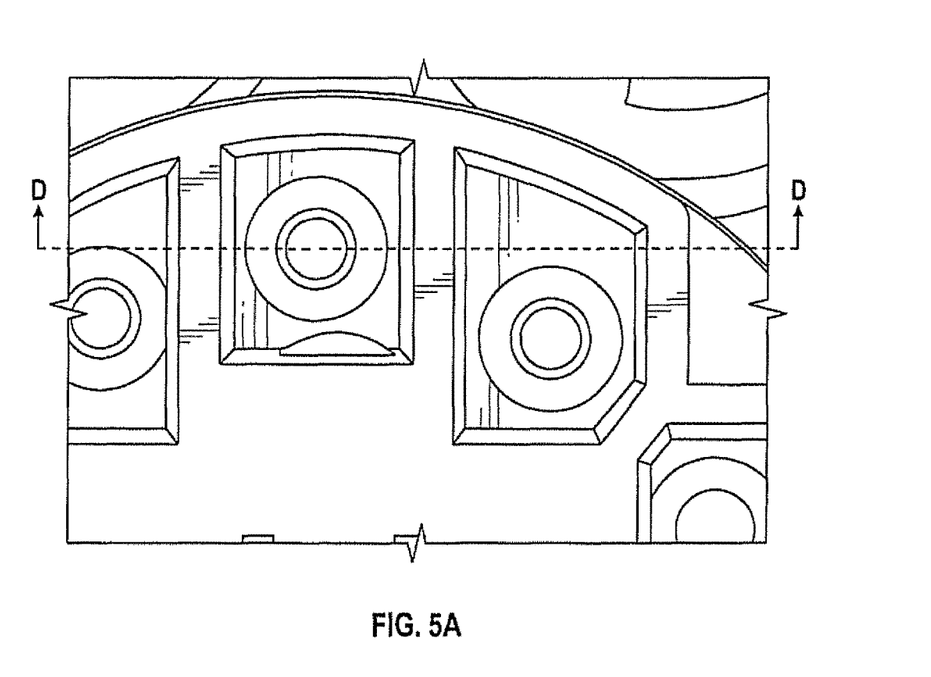
FIG. 5A is a detailed top view showing an instrument cluster with light blocking features according to one embodiment.
Figure 5B:
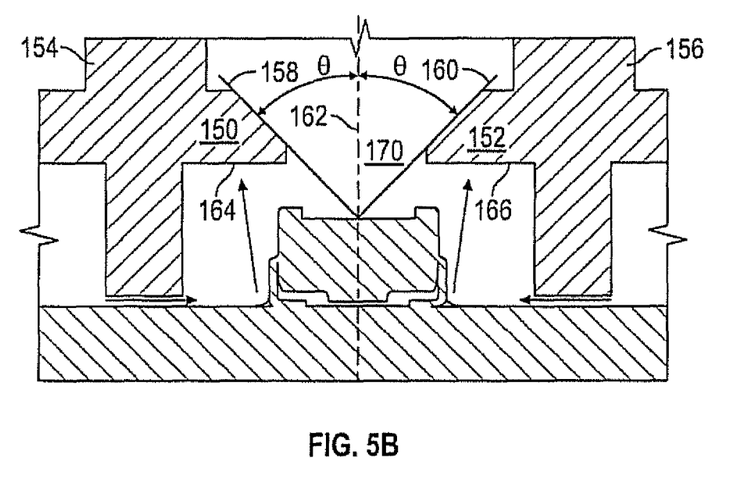
FIG. 5B is a detailed side view taken along line D-D of FIG. 5A showing one leaked light blocking feature according to one embodiment.
Figure 5C:
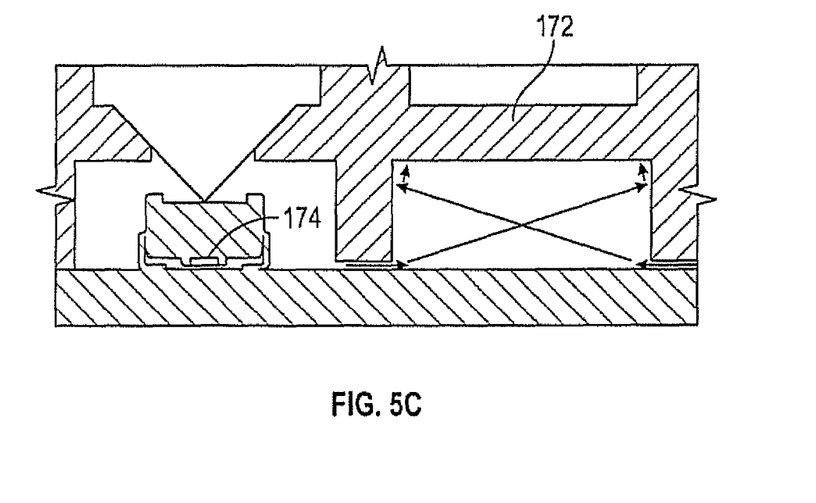
FIG. 5C is a detailed side view taken along line D-D of FIG. 5A showing another leaked light blocking feature according to one embodiment.

FIG. 5A is detailed top view of an instrument panel showing the light tunnels with leaked light blocking features in place, FIG. 5B and FIG. 5C are taken along line D-D of FIG. 5A and show different light blocking features that can be used with each of the above described light leakage problems. In FIG. 5B, a leaked light blocking feature 151 is shown for use to block light leakage due to reflection off solder joints. The light blocking feature consists of projections 150, 152 from the tunnel walls that are disposed at approximately perpendicular to the tunnel walls 154 and 156. Each projection extends a predetermined distance from the wall and terminates in an inclined surface 158 and 160. From a centerline 162 that may be drawn through the center of the LED and the tunnel, it can be seen that the inclined surfaces are each inclined at an angle Θ from the centerline. This angle Θ may be in the range of about 45 degrees. When light is leaked from an adjacent LED, it strikes the solder joints and is reflected onto the perpendicular surface 164, 166 of the horizontal projections and thereby is greatly blocked from traveling through the opening 170, which reduces false lighting of the telltale associated with that particular tunnel.

FIG. 5C shows a light blocking feature that may be used when it is desired to reduce or eliminate the light that leaks from an LED and might be reflected along the walls of an adjacent tunnel. In this embodiment, the adjacent light tunnel is blocked by a horizontal wall 172 extending across the width of the adjacent light chimney. When light leaks from an LED into a light chimney so equipped, the light reflects onto the horizontal wall and cannot travel toward the appliqué, thereby eliminating telltale lighting from that light chimney by leaked light.

Light leakage is reduced using the embodiments as described. For example, it has been determined that a telltale without the light blocking features is illuminated by leaked light with an intensity of 0.23 Cd/m², whereas a telltale with the blocking feature as described does not experience significant light leakage, and is illuminated with an intensity of 0.02 CD/m²

With the light blocking features as described, it has been determined that LED intensities at leaked telltales may also be reduced by approximately 90% to make telltale illumination by leaked light essentially imperceptible to human eyes. It has also been determined that the addition of the light blocking features as described impacts the telltale illumination intensities even when it is desired to light the telltale. It is therefore useful to optimize the size of the opening through which the light from the LED may travel in the tunnel. The size should be chosen so that the solder joints are obscured while maintaining the telltale lighting intensities within specification. For example, when the angle Θ was about 60 degrees, the telltale lighting intensities were comfortably within customer specifications, however the leaked light intensities also increased and were apparent in the actual parts. When the angle Θ was dropped to around 30 degrees, the leaked light was eliminated however the telltale lighting intensities dropped much below customer specification which could not be brought back to specification by increasing the LED current (as explained below).

It has also been determined that if telltale intensities drop below a specified value by adoption of the blocking features as described above, the LED currents may be increased to compensate for the loss of illumination. The reduction of the intensity of the LEDs may be varied with pulse width modulation (PWM) of current to the LED by controller such as Engine Control Unit (ECU) 174 having a memory and instructions therein for controlling the intensity of the LED as the pulse changes through the age of the vehicle and/or the LED. As set forth in TABLE 1 below, LED currents may be increased significantly without impacting the printed circuit board artwork.

TABLE 1

| | LED | | | Current (*1) | | | | Allowable increase up to | |
|---|---|---|---|---|---|---|---|---|---|
| Location | LED Color | Supplier | Part # | Rank 1 | Rank 2 | Rank 2 | Rank 4 | | |
| Red TT | Amber | Osram | LAT676 | 15.80 mA | 15.80 mA | 10.00 mA | 10.00 mA | 20 mA | → 26% increase |
| Green TT | Green | Nichia | NHSG017H | 4.80 mA | 3.40 mA | | | 8 mA | → 66% increase |
| Blue TT | Blue | Nichia | NESB064 | 9.00 mA | 6.40 mA | | | 18 mA | → 100% increase |
| Amber TT | Yellow | Osram | LYT676 | 15.80 mA | 15.80 mA | 10.00 mA | 10.00 mA | 20 mA | → 25% increase |

LED Currents-Improvements Margin

As set forth in TABLE 1 above, light intensity may be varied depending upon the color of the LED. For example, by PWM from the ECU, the LED intensity may be varied from a range of 25% for the Amber LED tested to a 100% increase in intensity form the Blue LED tested. Thus, by varying the current applied to the LEDs, intensities may be varied that will more than compensate for any loss in intensity occasioned by adoption of the leaked light blocking features as described.

While several embodiments have been described, it is apparent to those of ordinary skill in the art that the words used are not terms of limitation, but rather terms of description. Many variations and modifications are possible without departing from the scope and spirit of the invention as set forth in the appended claims.

What is claimed as new and desired to be protected by Letters Patent of the United States is:

1. An improved instrument cluster with reduced light leakage, comprising:

an outer panel, said outer panel having at least one aperture to accommodate at least one gauge;

an appliqué configured to have an instrument display, said instrument display further including at least one telltale; said telltale providing an indication of a vehicle status condition;

said appliqué overlying an inner panel, said inner panel configured with at least one projection extending substantially perpendicular to said applique;

said projections forming a light chimney between a circuit board and said appliqué, said circuit board equipped with at least one illumination source in a light chimney, said circuit board spaced apart from said inner panel projections, a light blocker positioned in said light chimney and proximal said illumination source, said light blocker projecting normal from each said inner panel projections; said light blocker further reducing light leakage from an adjacent light chimney.

2. The improved instrument cluster of claim 1, wherein said light blacker projection in said light chimney extends a distance toward each other but not touching each other to provide a gap there-between, each said light blocker having a surface at an angle Θ through which light may be transmitted toward the appliqué.

3. The improved instrument cluster of claim 2, wherein light leakage from another light tunnel.

4. The improved instrument cluster of claim 1, wherein said light blacker projection in an adjacent light tunnel is closed, thereby preventing light from leaking to said appliqué in said light tunnel.

5. The improved instrument cluster of claim 1, wherein Θ is 45 degrees taken along said inclined surface to a centerline of said illumination source.

6. The improved instrument cluster of claim 1, wherein said light leakage occurs when light from another light chimney shines through said gap between said projections and said circuit board.

7. The improved instrument cluster of claim 6, wherein said light strikes a solder joint holding said illuminating source in said circuit board and is reflected toward a telltale on said appliqué.

8. The improved instrument cluster of claim 1, further including fasteners at predetermined points in the instrument cluster to reduce buzz, noise and squeak which also reduce said gap between said projections and said circuit board.

9. The improved instrument cluster of claim 8, wherein said predetermined points in the cluster are located in close proximity to the telltales.

10. The improved instrument cluster of claim 1, wherein illumination source intensity may be controlled with a pulse width modulation from a controller.

11. The improved instrument cluster of claim 1, wherein said illumination source is a light emitting diode (LED).

12. The improved instrument cluster of claim 11, wherein each said LED is of a different color, and said intensity of each said LED may be changed a different amount.

* * * * *

UNITED STATES PATENT AND TRADEMARK OFFICE
CERTIFICATE OF CORRECTION

PATENT NO. : 10,112,532 B2
APPLICATION NO. : 15/430993
DATED : October 30, 2018
INVENTOR(S) : Anshuman Mittal et al.

Page 1 of 1

It is certified that error appears in the above-identified patent and that said Letters Patent is hereby corrected as shown below:

In the Claims

Column 7, Line 2 (Claim 2), "blacker" should be changed to "blocker."

Column 7, Line 10 (Claim 4), "blacker" should be changed to "blocker."

Signed and Sealed this
Twenty-fourth Day of September, 2019

Andrei Iancu
*Director of the United States Patent and Trademark Office*